United States Patent
Chen

(10) Patent No.: US 7,973,981 B2
(45) Date of Patent: Jul. 5, 2011

(54) METHOD FOR SELECTING AND ADJUSTING SCANNER ILLUMINANT

(75) Inventor: Chun-Jen Chen, Taichung (TW)

(73) Assignee: TransPacific IP Ltd., Wilmington, DE (US)

( * ) Notice: Subject to any disclaimer, the term of this patent is extended or adjusted under 35 U.S.C. 154(b) by 0 days.

(21) Appl. No.: 12/696,232

(22) Filed: Jan. 29, 2010

(65) Prior Publication Data
US 2010/0134856 A1 Jun. 3, 2010

Related U.S. Application Data

(63) Continuation of application No. 10/337,093, filed on Jan. 6, 2003, now Pat. No. 7,679,791.

(51) Int. Cl.
*H04N 1/04* (2006.01)
*H04N 1/46* (2006.01)

(52) U.S. Cl. ........................................ 358/474; 358/514

(58) Field of Classification Search .................. 358/514, 358/474, 487, 486, 494, 402
See application file for complete search history.

(56) References Cited

U.S. PATENT DOCUMENTS
5,777,508 A * 7/1998 Sawanobori .................. 327/534
* cited by examiner

*Primary Examiner* — Douglas Q Tran
(74) *Attorney, Agent, or Firm* — Stolowitz Ford Cowger LLP

(57) ABSTRACT

A scanner includes a first illuminant device having a first power associated therewith, and a second illuminant device having a second power associated therewith. The first power is greater than the second power, and each of the first illuminant device and the second illuminant device is configured to selectively scan a document. The scanner is configured to select one of the first illuminant device and the second illuminant device based, at least in part on, a level of power supplied to the scanner via a power source, and perform a single scan of the document using only the selected one of the first illuminant device and the second illuminant device.

20 Claims, 4 Drawing Sheets

METHOD FOR SELECTING AND ADJUSTING SCANNER ILLUMINANT

This application is a continuation of U.S. application Ser. No. 10/337,093 entitled "METHOD FOR SELECTING AND ADJUSTING SCANNER ILLUMINANT" filed on Jan. 6, 2003, and incorporates by reference Taiwan application Serial No. 91134239, filed Nov. 25, 2002.

BACKGROUND OF THE INVENTION

1. Field of the Invention

The invention relates in general to a method for selecting and adjusting scanner illuminants, and more particularly to a scanner illuminant selecting and adjusting method in accordance with the types of power supply.

2. Description of the Related Art

Of all the personal computer peripherals, scanner can be said to be one of the essential peripherals. As for the scanners currently available in the market, types of power supply are adopted: one adopts self power and is connected to an urban power 340 (as shown in FIG. 3), and the other adopts bus power and is connected to a computer host 350 (as shown in FIG. 3).

Since the self power: provides the scanner with higher power, the illuminant device installed in a self-powered scanner is allowed to be more power consuming. Under this circumstance, a cold cathode fluorescent lamp (CCFL) is normally used as the illuminant device. The cold cathode fluorescent lamp, although has the advantage of producing a higher level of brightness, is disadvantaged by being more power consuming and inconvenient to use.

Normally, the bus-powered scanner is convenient to use for its power is directly supplied by the computer. Due to the fact that the power supplied by bus power is relatively low, a light emitting diode (LED), which has the advantage of power saving, is normally installed as the illuminant device. The bus-powered scanner has the advantage of power saving, but produces a lower level of brightness when scanning images.

It is understood from the above disclosures that a conventional scanner has the following disadvantages:

1. More purchase costs. Scanners powered by self power and scanners powered by bus power have their individual applicable situations. To assure that different situations are all covered, two scanners covering different types of power supply are needed. Therefore more costs will be expended.

2. Inconvenience of use. While there are situations when quality and speed of image scanning carries more weight than power saving and convenience of use, there are situations when power saving and convenience of use are more important than quality and speed of image scanning Since different situations require different scanners adopting different types of power supply, inconvenience of use arises.

SUMMARY OF THE INVENTION

It is therefore an object of the invention to provide a method for selecting and adjusting scanner illuminants aiming:

1. to reduce costs of purchase; and
2. to improve convenience of use.

According to the foregoing objectives, a method for selecting and adjusting scanner illuminants whose features are depicted below is provided.

A method for selecting and adjusting scanner illuminants which is applied in a scanner including procedures herein below is provided. Start the scanner; determine what type of power supply the scanner is connected to; select suitable illuminant which fits the adopted power supply; and start to scan. Of which, the power supply adopted is either self power or bus power, while the suitable illuminant is either a high power illuminant or a low power illuminant. Another method including procedures herein below is also provided. Start the scanner; determine what type of power supply is adopted in the scanner; adjust the drive setting for the illuminant which fits the adopted power supply; drive the illuminant; and start to scan. Of which, the power supply adopted is either self power or bus power, while the drive setting for the illuminant is either a high power setting or a low power setting.

Other objects, features, and advantages of the invention will become apparent from the following detailed description of the preferred but non-limiting embodiments. The following description is made with reference to the accompanying drawings.

DETAILED DESCRIPTION OF THE INVENTION

There are two types of conventional scanners in terms of power supply: one is self-powered scanner, the other bus-powered scanner. When it comes to practical use of a scanner, there are advantages as well as disadvantages for both self-powered scanners and bus-powered scanners.

The scanner 310 according to the invention differs with conventional scanners in that the former can use self power as well as bus power as the power supply. According to the invention, the scanner 310 selects the illuminant 320 according to what type of power supply 340 or 350 is used. When the scanner is connected to self power, illuminant 320 with high power and high brightness will be selected as the illumination element. On the other hand, when connected to bus power, the scanner 310 will select illuminant 320 with low power and low brightness as the illumination element. The scanner 310 according to the invention has another method for adjusting illuminants 320. When the scanner 310 is connected to self power, the scanner 310 will use high voltage and high current drive setting to drive the illuminant 320. On the other hand, when connected to bus power, the scanner 310 will use low voltage and low current drive setting to drive the illuminant 320.

Both of the two above mentioned methods can be applied in a scanner regardless which type of power supply the scanner is connected to.

Figure 1:
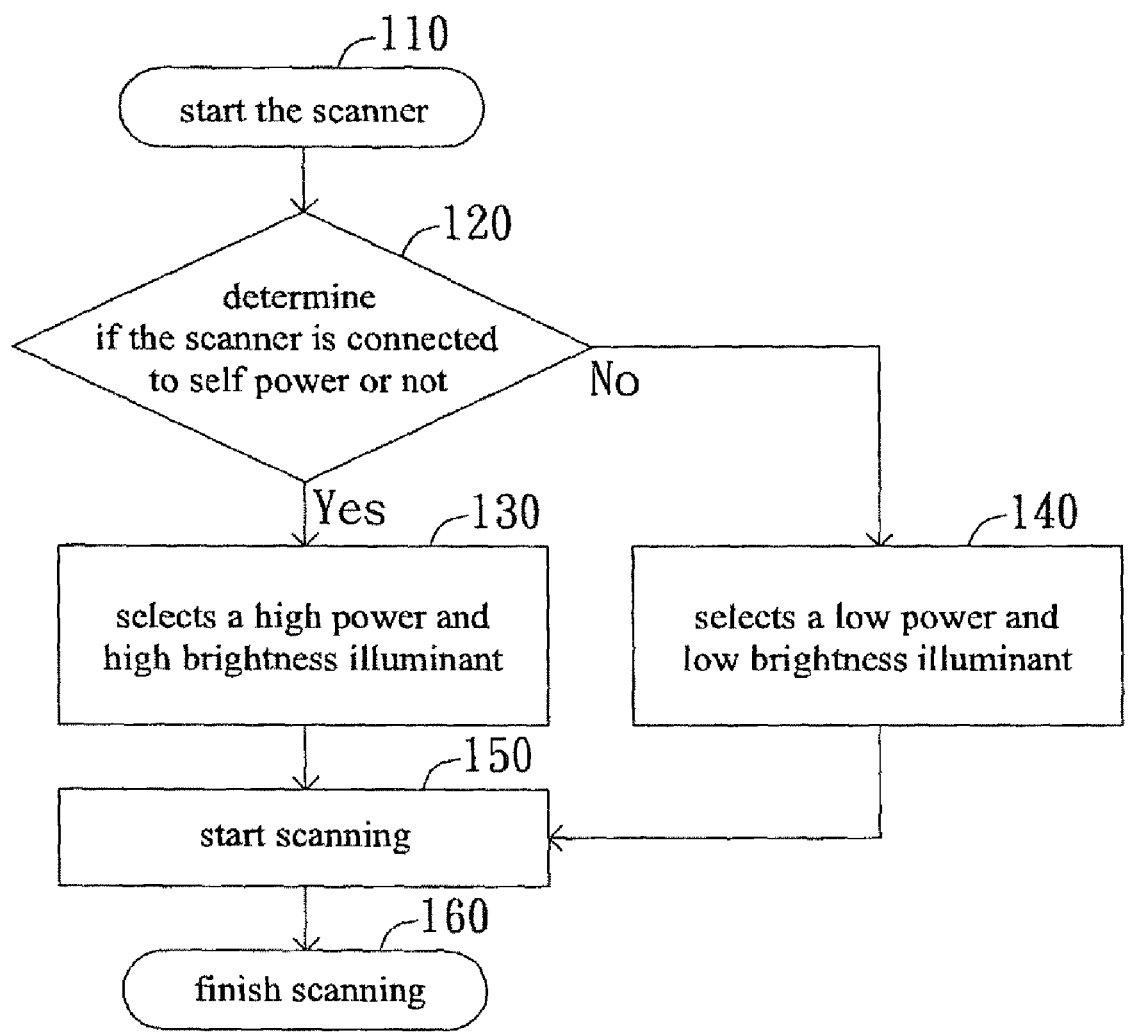
FIG. 1 shows a flowchart of a method for selecting scanner illuminants according to a preferred embodiment of the invention.

Please refer to FIG. 1, a flowchart of a method for selecting scanner illuminants according to a preferred embodiment of the invention is illustrated. The method includes the following procedures. First, the scanner is started in procedure 110. Next, proceed to procedure 120 where the scanner determines what type of power supply is adopted. If the scanner is connected to self power, proceed to procedure 130 where the scanner selects a high power and high brightness illuminant. If the scanner is connected to bus power rather than self power, proceed to procedure 140 where the scanner selects a low power and low brightness illuminant instead. After that, the scanner starts to scan in procedure 150. At last, the scanner finishes scanning in procedure 160.

Figure 4A:
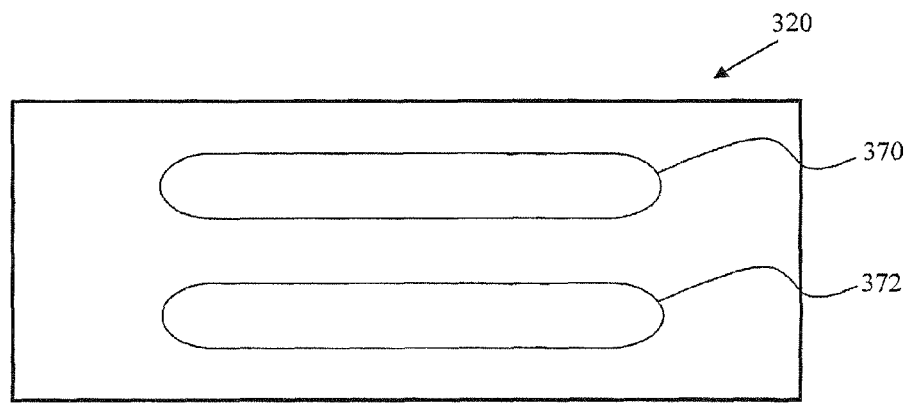
FIGS. 4a-c show illuminants according to embodiments of the invention.
Figure 4B:
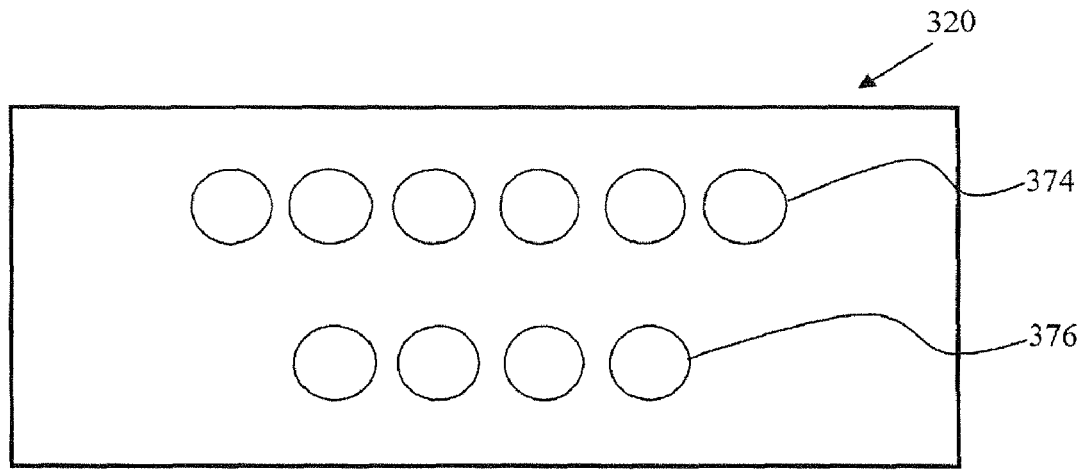
Figure 4C:
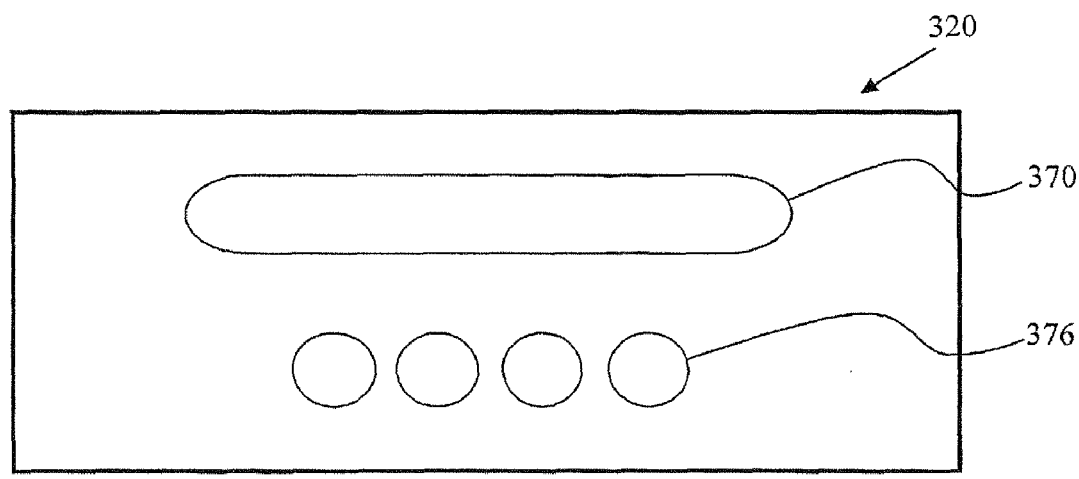

In the above disclosed method, the pairing for an illuminant with high power and high brightness and an illuminant with low power and low brightness are possible. For example, as shown in FIG. 4a, a high power and high brightness CCFL 370 can be paired with a low power and low brightness CCFL 372, a high power and high brightness LED 374 which consists of a larger number of LEDs can be paired with a low power and low brightness LED 376 which consists of a smaller number of LEDs (as shown in FIG. 4b), or a CCFL 370 can be paired with an LED 376 (as shown in FIG. 4c).

Figure 2:
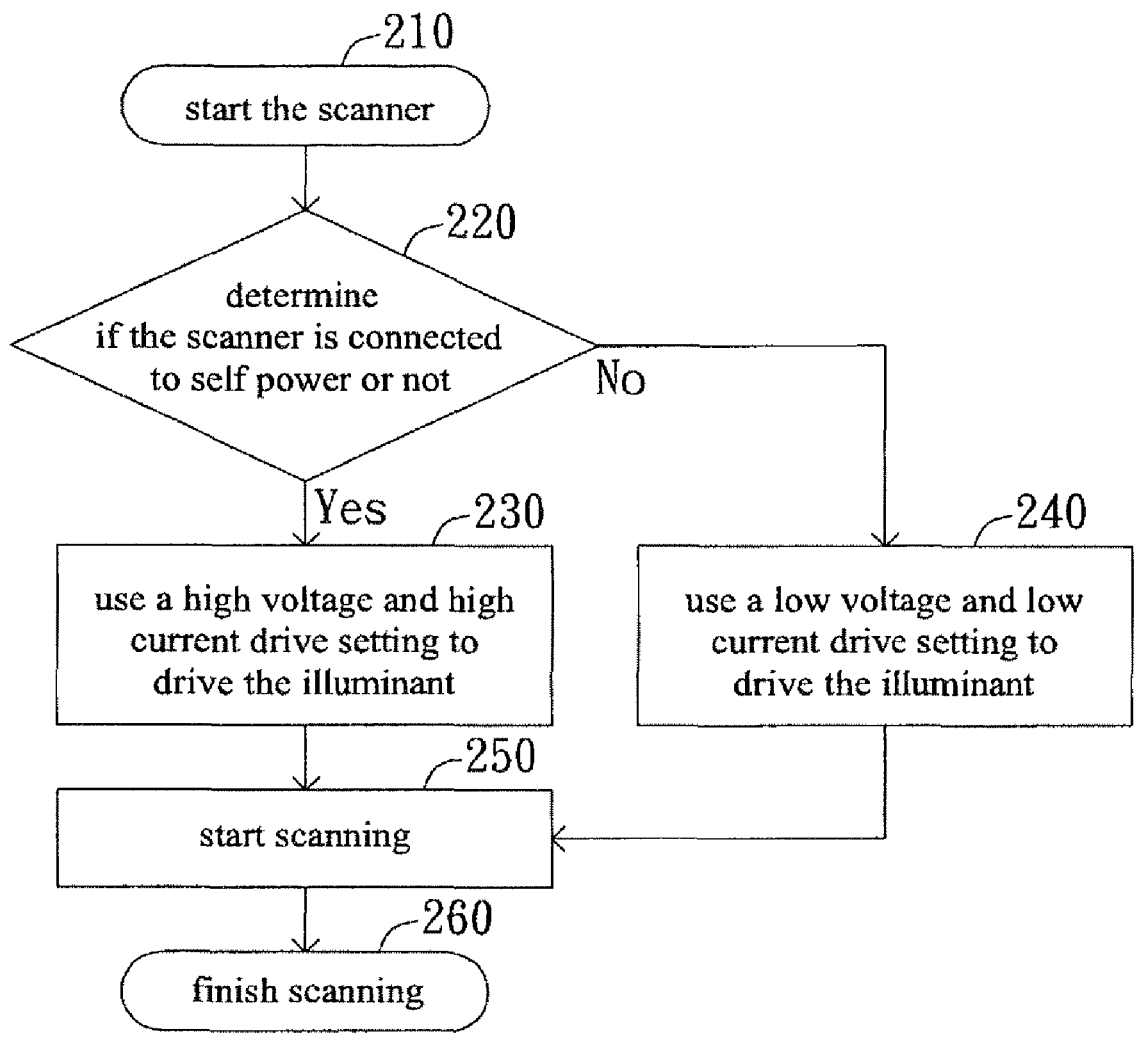
FIG. 2 shows a flowchart of a method for adjusting scanner illuminants according to a preferred embodiment of the invention.
Figure 3:
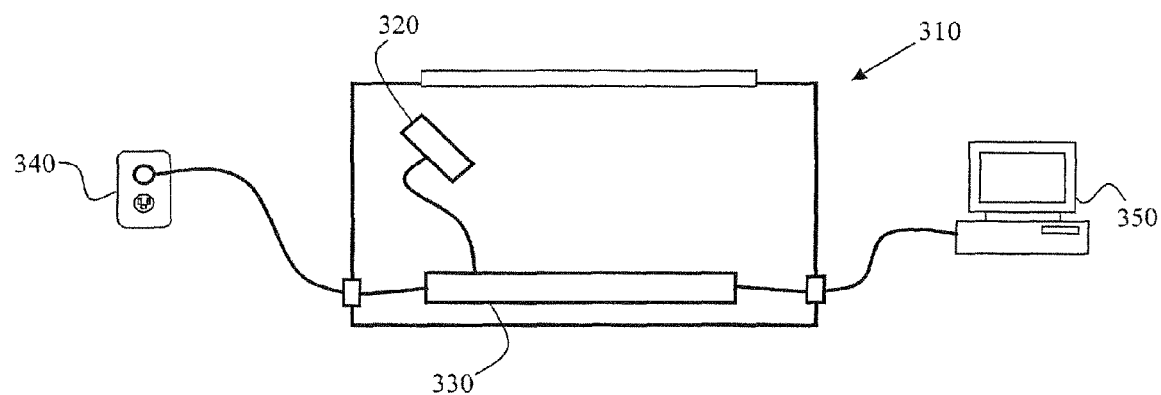
FIG. 3 shows a scanner according to embodiments of the invention.

Please refer to FIGS. 2 and 3, a flowchart of a method for adjusting scanner illuminants 320 according to a preferred embodiment of the invention is illustrated. The method includes the following procedures. First, the scanner 310 is started in procedure 210. Next, proceed to procedure 220 where the scanner 310 determines what type of power supply 340 or 350 is adopted. If the scanner 310 is connected to self power, proceed to procedure 230 where the scanner will adjust the drive setting 330 to be high voltage and high current to drive the illuminant 320. If the scanner 310 is connected to bus power rather than self power, proceed to procedure 240 where the scanner 310 adjusts the drive setting 330 to be low voltage and low current setting to drive the illuminant 320 instead. After that, the scanner 310 starts to scan in procedure 250. At last, the scanner 310 finishes scanning in procedure 260.

In the above method, the illuminant can be a CCFL. While high voltage and high current drive setting for illuminant enables the CCFL to produce a higher brightness, low voltage and low current drive setting for illuminant enables the CCFL to produce a lower brightness. Moreover, the illuminant can consist of a number of LED, high voltage and high current drive setting for illuminant drives all the LEDs to illuminate whereas low voltage and low current drive setting for illuminant drives only part of the LEDs to illuminate.

The above disclosed methods for selecting and adjusting scanner illuminants have at least the following advantages:

1. Saving purchase costs. Self-powered scanners and bus-powered scanners can be combined into one single scanner and thus be applied in different occasions. Regardless of what type of power supply the scanner is connected to, one scanner according to the invention would suffice.

2. Improving convenience of use. The scanner can be connected to self power as well as bus power, hence improving convenience of use.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

The invention claimed is:

1. A scanner comprising:
    a first illuminant device having a first power associated therewith; and
    a second illuminant device having a second power associated therewith, wherein the first power is greater than the second power, and each of the first illuminant device and the second illuminant device is configured to selectively scan a document, wherein the scanner is configured to:
    select one of the first illuminant device and the second illuminant device based, at least in part, on a level of power supplied to the scanner via a power source; and
    perform a single scan of the document using only the selected one of the first illuminant device and the second illuminant device.

2. The scanner of claim 1, wherein the scanner is further configured to adjust a scan speed based on the selected one of the first illuminant device and the second illuminant device.

3. The scanner of claim 1, wherein the scanner is further configured to detect the level of power supplied to the scanner, wherein the first illuminant device is selected responsive to detection of the first power, and wherein the second illuminant device is selected responsive to detection of the second power.

4. The scanner of claim 1, wherein the first power comprises an urban power source.

5. The scanner of claim 1, wherein the second power comprises power provided by a computer connected to the scanner.

6. The scanner of claim 1, wherein the first illuminant device consumes more power per scan than the second illuminant device.

7. The scanner of claim 1, wherein each of the first illuminant device and the second illuminant device is configured to scan a same side of the document.

8. A method, comprising:
    detecting a level of power supplied to a scanner, wherein a first level of power is associated with a first illuminant device, and wherein a second level of power is associated with a second illuminant device, each of the first illuminant device and the second illuminant device is configured to selectively scan a document;
    selecting one of the first illuminant device and the second illuminant device based, at least in part, on the level of power supplied to the scanner; and
    performing a single scan of the document using only the selected one of the first illuminant device and the second illuminant device.

9. The method of claim 8, further comprising adjusting a scan speed of the scanner based on the selected one of the first illuminant device and the second illuminant device.

10. The method of claim 8, wherein the first illuminant device is selected in response to detection of the first level of power, and wherein the second illuminant device is selected in response to detection of the second level of power.

11. The method of claim 8, wherein the first level of power is provided by an urban power source.

12. The method of claim 8, wherein the second level of power comprises bus power of a computer.

13. The method of claim 12, wherein the scanner is connected to the computer.

14. The method of claim 8, wherein the first illuminant device produces a relatively higher level of brightness in performing the single scan compared to the second illuminant device.

15. An apparatus, comprising:
    means for determining a level of power supplied to a scanner, wherein a first level of power is associated with a first illuminant setting, and wherein a second level of power is associated with a second illuminant setting, each of the first illuminant setting and the second illuminant setting for selectively scanning a document;
    means for selecting one of the first illuminant setting and the second illuminant setting based, at least in part, on the level of power supplied to the scanner; and means for performing a single scan of the document using only the selected one of the first illuminant setting and the second illuminant setting.

16. The apparatus of claim 15, further comprising means for adjusting a scan speed of the scanner based on the selected one of the first illuminant setting and the second illuminant setting.

17. The apparatus of claim 16, wherein the scan speed associated with the second illuminant setting is greater than the scan speed associated with the first illuminant setting.

18. The apparatus of claim 15, further comprising means for adjusting a scan speed of the scanner based on the determined one of the first level of power and the second level of power.

19. The apparatus of claim 15, wherein the scanner is configured to scan a same side of the document using either the first illuminant setting or the second illuminant setting.

20. The apparatus of claim 15, wherein the first illuminant setting is selected responsive to the second level of power being disconnected.

* * * * *

UNITED STATES PATENT AND TRADEMARK OFFICE
CERTIFICATE OF CORRECTION

| | | |
|---|---|---|
| PATENT NO. | : 7,973,981 B2 | Page 1 of 1 |
| APPLICATION NO. | : 12/696232 | |
| DATED | : July 5, 2011 | |
| INVENTOR(S) | : Chen | |

It is certified that error appears in the above-identified patent and that said Letters Patent is hereby corrected as shown below:

Column 1, line 3, below Title insert -- CROSS-REFERENCE TO RELATED APPLICATIONS --.

Signed and Sealed this
Twenty-second Day of November, 2011

David J. Kappos
*Director of the United States Patent and Trademark Office*